Patented Sept. 6, 1938

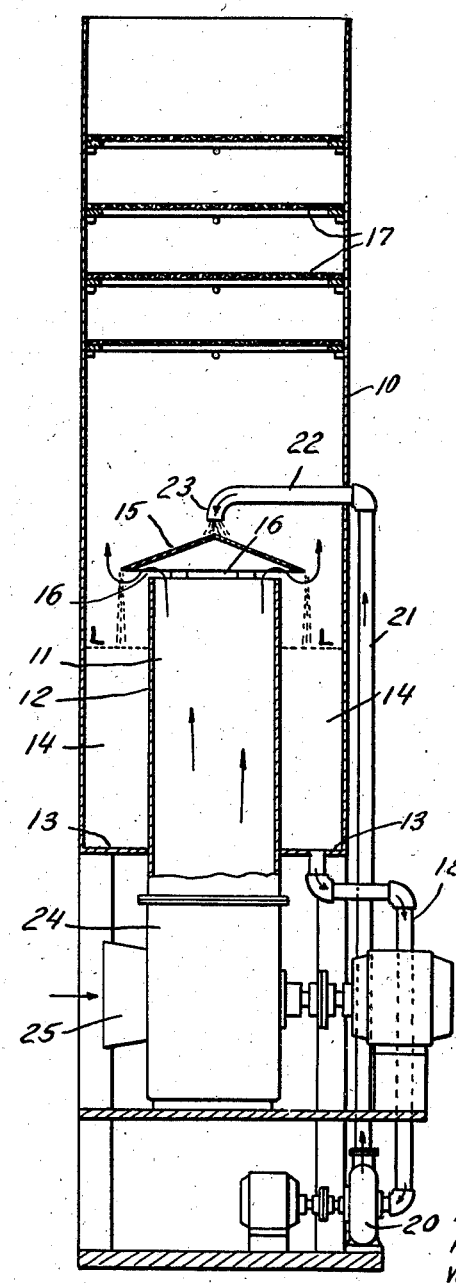

2,129,275

UNITED STATES PATENT OFFICE 2,129,275

FUMIGATION

Albert Hartzell, Frank Wilcoxon, and William J. Youden, Yonkers, N. Y., assignors to Boyce Thompson Institute for Plant Research, Inc., Yonkers, N. Y., a corporation of New York Application January 9, 1934, Serial No. 705,834

8 Claims. (Cl. 21—53)

This invention relates to fumigation and has for an object the provision of an improved method and apparatus for fumigating enclosures. More particularly, the invention contemplates the provision of a method whereby a desired degree of concentration of a fumigant in the atmosphere of an enclosure may be maintained over considerable periods of time.

Heretofore, two general methods of fumigating enclosures have been practiced. The first and more primitive method comprised introducing into the enclosure to be fumigated a volatile or combustible fumigant, and permitting it to vaporize or burn and thus to build up an effective concentration of fumigant in the atmosphere of the enclosure. This method is recommended by its simplicity, and is satisfactory for the fumigation of sick rooms, warehouses, and other enclosures in which the only objects that will be harmed by the fumigant are the germs, insects, vermin, and the like, which it is desired to destroy.

For the fumigation of enclosures containing substances and/or organisms sensitive to a relatively high degree of concentration of fumigant, such as greenhouses, the method outlined above is not satisfactory. When a fumigant is allowed to vaporize or burn within an enclosure, it is not possible to limit the concentration attained by the fumigant in the atmosphere of the enclosure to a properly effective predetermined maximum. Consequently, in fumigating by the above method enclosures containing substances and/or organisms which are to be preserved and which are sensitive to a relatively high degree of concentration of fumigant, it has been customary to use the fumigant in an amount substantially less than the amount most suitable for effective destruction of the germs, insects, vermin, and the like to be destroyed, for fear that the sensitive substances and organisms would themselves be harmed by the fumigant.

According to the second general method, a volatile fumigant is exposed to a current of gas, for example, air, in which vapors of the fumigant become incorporated, and the resulting fumigant-charged gas is then introduced into the enclosure to be fumigated. A number of advantages attend the use of this method. For example, the degree of concentration of the fumigant in the gas may be controlled within limits by controlling the period of time during which the gas is in contact with the volatile fumigant, by controlling the temperature of the volatile fumigant, or by controlling both the period of time during which the gas is in contact with the volatile fumigant and the temperature of the volatile fumigant. In this manner, one may be sure that the degree of concentration of fumigant in the gas introduced into the enclosure is not great enough to harm the sensitive organisms, such as plants, contained in the enclosure, while at the same time one may be sure that the degree of concentration is sufficiently great to effectively control the harmful germs, insects, vermin and the like.

Together with these advantages, however, several disadvantages appear. Thus, it is necessary continually to draw upon a supply of gas to be charged with fumigant, for if the atmosphere within the enclosure being fumigated were continuously recirculated through the volatile fumigant, the concentration of the fumigant vapors in the atmosphere of the enclosure would steadily increase, and eventually would reach a degree of concentration harmful to sensitive organisms to be preserved. This continual use of fresh gas to be charged with fumigant results in the consumption of a greater amount of fumigant than would be necessary were it possible to recirculate the already partially charged atmosphere of the enclosure through the volatile fumigant. Since the gas generally used is air, the necessity of continually drawing it from an outside source is a decided disadvantage, particularly in winter when the outside temperature is low.

It is one of the objects of the present invention to overcome the above-enumerated disadvantages attending the use of the second general method. This we accomplish by adjusting the vapor pressure of the fumigant to some predetermined value, corresponding to the degree of concentration of fumigant desired in the atmosphere of the enclosure to be fumigated.

This adjustment is in turn achieved by utilizing the well-known principle that the vapor pressure of a substance is lowered when the substance is placed in solution. If the fumigant is incorporated in a solution, its vapor pressure may be lowered by any desired degree, and the concentration of the fumigant in a current of gas passed in contact with the solution can never rise above a value determined by the molar concentration of the fumigant in the solution. Control of the concentration of fumigant in the gas permits the recirculation of the atmosphere in greenhouses and other enclosures and thus provides for more definite temperature control.

The solution employed may be either a solid solution or a liquid solution, and in fact both kinds have been successfully used.

The solutions may be formed in any suitable manner, and each may contain one or more fumigants and one or more solvents. Diluents of any suitable type may be incorporated with the fumigants and solvents.

The degree of concentration of the fumigant in a gas passed in contact with a solution, at equilibrium, will be determined by the concentration of the fumigant in the solution. When a saturated solution or a solution containing an excess of fumigant is employed the gas will be saturated with fumigant vapors at equilibrium. When solutions containing amounts of fumigant less than those required for saturation are employed, the concentration of fumigant in the gas at equilibrium will be substantially proportional to the percentage saturation of the solution.

The choice of an appropriate solvent for the naphthalene necessitates a consideration of the requirements that such a solvent must meet. The vapor pressure of the solvent should be very low, preferably not greater than 0.1 mm. at room temperature; otherwise the large volumes of gas passed through or in contact with the solution will remove a considerable quantity of solvent along with the naphthalene. The solvent vapors should not be toxic to plants or harmful to other substances to be preserved in the concentration which the partial pressure of the solvent will build up in the current of air. The solubility of the fumigant in the solvent ought to be considerable so that the removal of the fumigant during the fumigation will not greatly alter the original concentration. The solvent must not corrode the metal parts of the apparatus in which it is used. It should be inexpensive and readily obtained in quantity upon short notice. Hygroscopic qualities are undesirable since dilution might occur through the accumulation of water. Many of these qualities are found in certain petroleum hydrocarbons, such as the light motor oils. The solubility of naphthalene in an oil with an S. A. E. rating of 20 is about ten per cent by weight.

While any enclosure may be successfully fumigated by the process of the invention, we have found that greenhouses represent one type of enclosure for the fumigation of which the process of the present invention is particularly well adapted. For this reason, the following description of the process will refer principally to the fumigation of greenhouses, but it readily will be seen that other enclosures may be fumigated in substantially the same manner. By way of example, air will be considered to be the gas to be charged with fumigant.

Naphthalene has been found to be a fumigant which is well adapted for use in the processes and apparatus described herein, and particular reference will, therefore, be made to the use of this substance as the fumigant. It will be understood, however, that by such reference we do not intend to limit ourselves to the use of naphthalene, for other fumigants having suitable properties are known to those familiar with the art, and may be obtained upon the market in commercial quantities.

In utilizing a solid solution as the substance by means of which vapors of fumigant are introduced into the atmosphere of the enclosure to be fumigated in accordance with a preferred method of the invention, the solid solution is first prepared and broken into small pieces. These small pieces are then supported upon trays or shelves within a suitable receptacle, and air is passed over them. In this manner, the fumigant is vaporized from the solid solution, and vapors of fumigant are carried off by the current of air and with it are introduced into the greenhouse or other enclosure to be fumigated.

The air to be charged with fumigant vapor is preferably that comprising the atmosphere of the greenhouse, and it is drawn into and forced through the receptacle containing the solid solution by any suitable means, for example, by a fan.

The degree of concentration of the fumigant in the air will, at equilibrium, be dictated by the concentration of the fumigant in the solid solution. Thus, if the solid solution is saturated with or contains an excess of fumigant, the current of air will be saturated, at equilibrium, with fumigant vapor. Similarly, if the solid solution is 50% saturated with fumigant, the current of air, at equilibrium, will be approximately 50% saturated with fumigant vapor. Since the concentration of fumigant in the air at saturation is a substantially definite determinable quantity, it is apparent that if the concentration of the fumigant in the solid solution is fixed at a predetermined value, the maximum theoretical concentration of fumigant vapor in the current of air may be adjusted to any desired value. The principles here involved are those obtained from a study of the partial pressures of the vapors above a solid solution.

The solid solution itself may be prepared by melting together a fumigant, such as naphthalene, and a suitable solvent or diluent, in appropriate predetermined proportions.

We have found that sulphur is very satisfactory as the diluent. When using sulphur and naphthalene, the two are mixed together in suitable proportions and melted. The molten product is preferably stirred, and is then poured into pans and allowed to cool. The solid solution resulting from the freezing of the melt is broken up into small pieces to provide a large surface for vaporization of the naphthalene, and is introduced into the container through which the atmosphere of the greenhouse is to be circulated.

Although for many purposes a solid solution is suitable, it is frequently found that the greater flexibility and ease of control of liquid solutions render their use in the fumigation of enclosures advantageous. In preparing a liquid solution, the fumigant, such as naphthalene is dissolved to an appropriate concentration in a suitable liquid diluent or solvent.

We have found that a solution of 5 percent or more by weight of naphthalene in a suitable petroleum hydrocarbon will produce satisfactory results. Air, after passing in contact with a solution of this composition retained in a suitable apparatus, will exhibit efficient fumigating characteristics.

A suitable apparatus for the use of a liquid solution, such as naphthalene dissolved in a petroleum hydrocarbon, is illustrated, partially in section, in the single figure of the accompanying sheet of drawings.

Within a container 10, open at the top, is disposed a chamber 11 bounded by walls 12, the lower end portions of which are disposed adjacent the floor 13 of the container, and the upper end portions of which are disposed adjacent a mid-portion of the container 10. A circumambient reservoir 14 is thereby formed between the inner surfaces of the walls of the container and the outer surfaces of the walls 12 of the chamber.

Above the upper ends of the walls 12 of the chamber 11 is disposed a plate 15, substantially conical in shape, the apex of which points upwardly substantially along the center line of the chamber 11. The periphery of the plate 15 extends beyond the outer surfaces of the walls 12 of the chamber. The under surface of the plate is supported sufficiently far above the upper ends of the walls 12 to provide an aperture, or series of apertures, 16 between the upper ends of the walls 12 and the undersurface of the plate 15.

Arranged at a suitable distance above the plate 15 are a plurality of filters 17, constructed of cheesecloth or other appropriate material, which serve to catch entrained droplets of liquid which might be carried upwardly by the rising current of air.

A conduit 18 connects the interior of the circumambient liquid reservoir 14 at the floor 13 with the intake of a pump 20, and the discharge of the pump is connected by a conduit 21 with another conduit 22, which passes through a wall of the container 10. The conduit 22 is provided with a downwardly curved portion 23 which serves to discharge liquid passing through the conduit directly over the apex of the conical plate 15.

A fan 24 communicates with the interior of the chamber 11, and serves to draw the atmosphere in the vicinity of the fan through the intake 25 and to force it upwardly through the chamber 11.

In using the above-described apparatus, a solution of fumigant in a suitable liquid diluent is introduced into the circumambient reservoir, approximately to a depth indicated by the liquid level L. The centrifugal pump 20 is started and the solution begins to circulate through the apparatus, passing through the conduit 18, the pump 20 and the conduits 21 and 22, and emerging from the curved portion 23 of the conduit 22 to fall upon the upper surface of the conical plate 15 in the vicinity of its apex. By the force of gravity, the solution runs down the upper surface of the conical plate, and falls as a rain from the periphery thereof to the body of the solution confined within the circumambient reservoir.

Meanwhile the fan 24 has been started and air is being drawn through the intake and is being forced upwardly through the chamber 11. Upon reaching the upper portion of the chamber, the air is deflected outwardly through the apertures 16 by the under surface of the conical plate. Thence it passes through the rain of solution falling from the periphery of the plate, and in so doing, is charged with fumigant which is vaporized from the solution.

The air, now charged with fumigant and carrying also entrained droplets of solution, continues its upward journey and passes through the filters 17. Here the entrained droplets of solution are mechanically removed from the current of air, and collect upon the fabric of the filter, from which they drip after coalescence into larger drops.

The fumigant-charged air, free from entrained droplets of solution, is discharged into the atmosphere of the enclosure in which the apparatus is placed through the open top of the container 10.

A consideration of the apparatus above-described will indicate that it possesses certain advantages which render it eminently suitable for the fumigation of greenhouses. For example, it may be compactly constructed, and if mounted upon wheels, may be readily moved through the aisles of the greenhouse to any part thereof. It is entirely self contained, requiring only a connection with a source of electric current to drive the small motors which themselves drive the fan and the pump. The greatest advantage, however, resides in the fact that the atmosphere of the greenhouse may be continually circulated through the apparatus without fear of obtaining too high a degree of concentration of fumigant in the atmosphere, and this in turn is owing to the particular qualities of the solution used.

As described above, a solution of naphthalene in a petroleum hydrocarbon, such as a light motor oil, will yield satisfactory results, but those familiar with the art will readily discern that other fumigants may be dissolved in other diluents, without departing from the spirit of the present invention or the scope of the appended claims. The following discussion of theoretical and experimental results will be concerned with a solution of naphthalene dissolved in a petroleum hydrocarbon, which comprises a presently preferred solution.

A solution of 5% by weight of naphthalene in a light motor oil represents approximately a one-half saturated solution. If the similarity in chemical nature of the solute and solvent justify the assumption of a perfect solution, then the partial vapor pressure of naphthalene over the solution is one-half the vapor pressure over pure naphthalene, which at room temperature is approximately 0.1 mm. A greenhouse with a capacity of 6000 cubic feet requires, then, $$\frac{6000 \times 28.3}{24.6} \times 128 \times \frac{.05}{760} = 58.2 \text{ grams of naphthalene}$$

to build up an equilibrium concentration of naphthalene in the atmosphere. (The gram molecular volume at 30° C. is 24.6 liters and one cubic foot equals 28.3 liters. The molecular weight of naphthalene is 128.)

In greenhouse practice we have found that a higher concentration than 5% of naphthalene in oil will be required due to the inevitable leakage of air which constantly dilutes the equilibrium mixture. The fact that about 1.5 pounds of naphthalene are removed from the solution in the course of a fumigation, lasting from about 13 to 16 hours, indicates the extent of this loss. Consequently, the initial concentration of naphthalene in the oil may advantageously be made as high as 8 or 9 percent in some instances.

The concentration of the solution is readily adjusted by adding naphthalene flakes and running the pump for a few minutes to circulate the oil and bring about solution. During the course of our experiments, the original solutions were generally prepared from 7.5 gallons of oil and 4 pounds of naphthalene, resulting in a solution of 6.8 percent naphthalene by weight. Determinations of the specific gravity of the solution were made at the start and conclusion of each run in order to establish the amount of naphthalene consumed.

As an indication of the suitability of the invention herein described for the fumigation of greenhouses, the following experimental procedure and results are herewith presented.

Some preliminary laboratory experiments were performed with oil solutions containing various percentages of naphthalene. Leaves infested with red spider mite (*Tetranychus telarius* L.) were confined in a shallow glass vessel in which was also placed an open dish of the oil solution. These experiments are listed in Table I and show that complete control was obtained with solutions containing 5% or more of naphthalene by weight. In some cases a dessicator, arranged so that both the oil and air were stirred, was used to insure equilibrium conditions.

TABLE I

*Results of laboratory tests on red spider mite exposed to naphthalene dissolved in oil*

| Percent naphthalene by weight | Number alive | Number dead | Percent kill |
|---|---|---|---|
| 2 | 5 | 4 | 45 |
| 3 | 15 | 16 | 52 |
| 3.5 | 4 | 27 | 87 |
| 4 | 2 | 14 | 88 |
| 4 | 3 | 26 | 90 |
| 4.5 | 0 | 44 | 100 |
| 5.0 | 2 | 12 | 86 |
| 5.0 | 0 | 38 | 100 |
| 5.5 | 0 | 20 | 100 |
| 5.5 | 0 | 36 | 100 |
| 6 | 0 | 17 | 100 |
| 8 | 0 | 20 | 100 |

We have found that commercial fumigation of greenhouses is entirely practicable by the use of the present invention, and by way of example we append the following experimental results, obtained under the conditions given.

Fumigations were begun either at 4 p. m. or at 5 p. m. and continued until 6 a. m., 8 a. m. or 9 a. m., depending on whether periods of 13, 14, 15 or 16 hours' duration were desired. Greenhouse sections of a capacity of 6000 cubic feet were fumigated. The plants were grown in pots or in flats and were watered before the fumigation was started, inasmuch as experience has shown that a high relative humidity is desirable to avoid injury to the foliage. The most favorable temperature range for fumigation was found to be between 68° F. and 80° F.

The difficulty of detecting analytically the concentration of naphthalene vapor in air led to the use of tomato plants, of the variety Bonny Best, and buckwheat as test plants, which investigation had shown would indicate the maximum and minimum concentrations respectively for satisfactory control of the red spider mite, and at the same time would be within the tolerance limit of other plants commonly grown in greenhouses.

Th red spider mite was selected as a suitable test species for the efficiency of a given fumigation as previous investigation had shown that it is more difficult to eradicate than the cyclamen mite (*Tarsonemus pallidus* Bks.), the onion thrips (*Thrips tabaci* Lind.), or the black grain thrips (*Heliothrips femoralis* Reuter). Counts of living and dead mites were made 24 hours after treatment.

Tests with solid solutions of naphthalene and sulphur, the content of which ranged from 20 to 90 percent of naphthalene, indicated that a solid solution containing 90 percent naphthalene and 10 percent sulphur could be used without injury to the foliage of the most sensitive plants tested (Table II). Similarly, no foliage injury was observed on plants fumigated by means of the naphthalene-oil method at the concentrations reported in Table II. Marigold, calendula, cosmos, carnation, and hydrangea were fumigated while in bloom without injury to the flowers.

Table II

*Percentage control of red Spider mite by naphthalene vapor*

| Exposure to naphthalene vapors, hours | Percent naphthalene | Temperature | | Relative humidity, percent | Number of specimens | Percent control |
|---|---|---|---|---|---|---|
| | | Maximum °F. | Minimum °F. | | | |
| *Naphthalene-sulphur* | | | | | | |
| 13 | 90 | 78 | 65 | 88 | 179 | 95 |
| 14 | 90 | 86 | 68 | 88 | 502 | 99 |
| 14 | 90 | 76 | 60 | 68 | 200 | 99 |
| 15 | 20 | 74 | 70 | 88 | 368 | 80 |
| 15 | 25 | 80 | 76 | 85 | 115 | 80 |
| 15 | 20 | 84 | 72 | 88 | 212 | 89 |
| 15 | 75 | 82 | 68 | 80 | 115 | 93 |
| 15 | 75 | 100 | 68 | 88 | 229 | 91 |
| 18 | 75 | 100 | 68 | 88 | 204 | 90 |
| 15 | 100 | 89 | 80 | 60 | 253 | 99 |
| 14 | 100 | 100 | 68 | 88 | 200 | 100 |
| *Naphthalene-oil* | | | | | | |
| 16 | 6.7 | 95 | 65 | | 211 | 89 |
| 16 | 6.6 | 69 | 62 | | 222 | 96 |
| 16 | 7.9 | 80 | 60 | | 250 | 100 |
| 16 | 9.5 | 100 | 77 | 70 | 200 | 100 |

The percent of mites killed ranged from 95 to 100 when solid solutions of naphthalene (90 percent) and sulphur (10 percent) were used. Solid solutions made up of lower percentages of naphthalene were not effective, while pure naphthalene was impractical because of injury to foliage. Equally successful fumigations were obtained with the liquid solution method.

Plants infested with a species of Tarsonemus mite resembling the cyclamen mite, the specific identity of which has not yet been established, were included in a number of fumigations. This species seems to have about the same tolerance for naphthalene vapor as the cyclamen mite and was readily eradicated at the concentration required to kill the red spider mite.

We claim:

1. The method of fumigating an enclosure which comprises preparing a solid solution comprising a fumigant and a diluent in such proportions that the vapor pressure of the fumigant is adjusted to a predetermined value, passing a gas in contact with the solid solution to charge the gas with the fumigant, and introducing the fumigant-charged gas into the enclosure to be fumigated.

2. The method of fumigating an enclosure which comprises preparing a solid solution comprising a fumigant and sulphur in such proportions that the vapor pressure of the fumigant is adjusted to a predetermined value, passing a gas in contact with the solid solution to charge the gas with the fumigant, and introducing the fumigant-charged gas into the enclosure to be fumigated.

3. The method of fumigating an enclosure which comprises preparing a solid solution comprising naphthalene and sulphur in such proportions that the vapor pressure of the naphthalene is adjusted to a predetermined value, passing a gas in contact with the solid solution to charge the gas with naphthalene vapors, and introducing the naphthalene vapor-charged gas into the enclosure to be fumigated.

4. The method of fumigating a greenhouse which comprises circulating the atmosphere within the greenhouse in contact with a solution comprising a fumigant and a non-toxic diluent in such proportions that the vapor pressure of the fumigant over the solution corresponds substantially to the maximum partial pressure of fumigant vapor which it is desired to build up in the atmosphere of the greenhouse.

5. In the fumigation of enclosures with a fumigant-charged gas, the method of controlling the concentration of the fumigant in the gas which comprises preparing a solution comprising the fumigant and a non-toxic diluent in such proportions that the vapor pressure of the fumigant over the solution corresponds substantially to the maximum partial pressure of fumigant vapor which it is desired to build up in the gas, and then passing a gas in contact with the solution to charge the gas with the fumigant.

6. The method of fumigating plants in a greenhouse which comprises preparing a liquid solution comprising a fumigant and a diluent, the vapors of which at room temperature are substantially non-toxic to the plants to be fumigated, adjusting the proportion of fumigant to diluent in the solution so that the vapor pressure of the fumigant over the solution corresponds substantially to the maximum partial pressure of fumigant vapor which it is desired to build up in the atmosphere of the greenhouse, passing a gas in contact with the liquid solution to charge the gas with the fumigant, and introducing the fumigant-charged gas into the greenhouse.

7. The method of fumigating an enclosure which comprises preparing a solution comprising naphthalene and a petroleum hydrocarbon having a vapor pressure at room temperature not substantially greater than 0.1 mm., adjusting the proportion of naphthalene to petroleum hydrocarbon in the solution so that the vapor pressure of the naphthalene over the solution corresponds substantially to the maximum partial pressure of naphthalene vapor which it is desired to build up in the enclosure to be fumigated, passing a gas in contact with the solution to charge the gas with naphthalene vapors, and introducing the naphthalene vapor-charged gas into the enclosure to be fumigated.

8. A method of maintaining substantially constant the concentration of a fumigant in the atmosphere of an enclosure being fumigated which comprises continuously withdrawing the atmosphere of the enclosure from the enclosure, passing it in contact with a solution comprising a fumigant and a diluent in such proportion that the vapor pressure of the fumigant over the solution corresponds substantially to the maximum partial pressure of fumigant vapor desired in the atmosphere of the enclosure, and re-introducing the atmosphere into the enclosure.

ALBERT HARTZELL.
FRANK WILCOXON.
WILLIAM J. YOUDEN.